(12) United States Patent
Mosterman et al.

(10) Patent No.: US 10,810,790 B1
(45) Date of Patent: Oct. 20, 2020

(54) IDENTIFICATION AND CORRECTION OF TEMPORAL AGES IN SEPARATE SIGNAL PATHS OF A GRAPHICAL MODEL

(71) Applicant: The MathWorks, Inc., Natick, MA (US)

(72) Inventors: Pieter J. Mosterman, Framingham, MA (US); Justyna Zander, Framingham, MA (US)

(73) Assignee: TheMathWorks, Inc., Natick, MA (US)

( * ) Notice: Subject to any disclaimer, the term of this patent is extended or adjusted under 35 U.S.C. 154(b) by 1090 days.

(21) Appl. No.: 14/136,307

(22) Filed: Dec. 20, 2013

Related U.S. Application Data

(60) Provisional application No. 61/770,763, filed on Feb. 28, 2013, provisional application No. 61/770,767, filed on Feb. 28, 2013.

(51) Int. Cl.
*G06T 17/00* (2006.01)

(52) U.S. Cl.
CPC .................... *G06T 17/00* (2013.01)

(58) Field of Classification Search
CPC ................ G06T 17/00; G01V 99/00
See application file for complete search history.

(56) References Cited

U.S. PATENT DOCUMENTS

| | | | | |
|---|---|---|---|---|
| 5,452,226 A | * | 9/1995 | Hooper | G06F 17/505 716/104 |
| RE35,414 E | * | 12/1996 | Murakami | G06T 9/008 348/420.1 |
| 2005/0268263 A1 | * | 12/2005 | Sun | G06F 17/5031 716/114 |
| 2006/0247906 A1 | * | 11/2006 | Austin | G06F 17/5031 703/16 |
| 2010/0175045 A1 | * | 7/2010 | Ciolfi | G06F 8/34 717/105 |

* cited by examiner

*Primary Examiner* — Janet L Suglo
(74) *Attorney, Agent, or Firm* — Cesari and McKenna, LLP; Michael R. Reinemann

(57) ABSTRACT

A device may determine temporal ages of a first signal and a second signal provided in a graphical model generated in a technical computing environment, where the first signal is different than the second signal. The device may determine whether the temporal age of the first signal is equivalent to the temporal age of the second signal at a particular block of the graphical model. The device may either display an indication that the first signal is synchronized with the second signal when the temporal age of the first signal is equivalent to the temporal age of the second signal, or may display another indication that the first signal is not synchronized with the second signal when the temporal age of the first signal is not equivalent to the temporal age of the second signal.

32 Claims, 13 Drawing Sheets

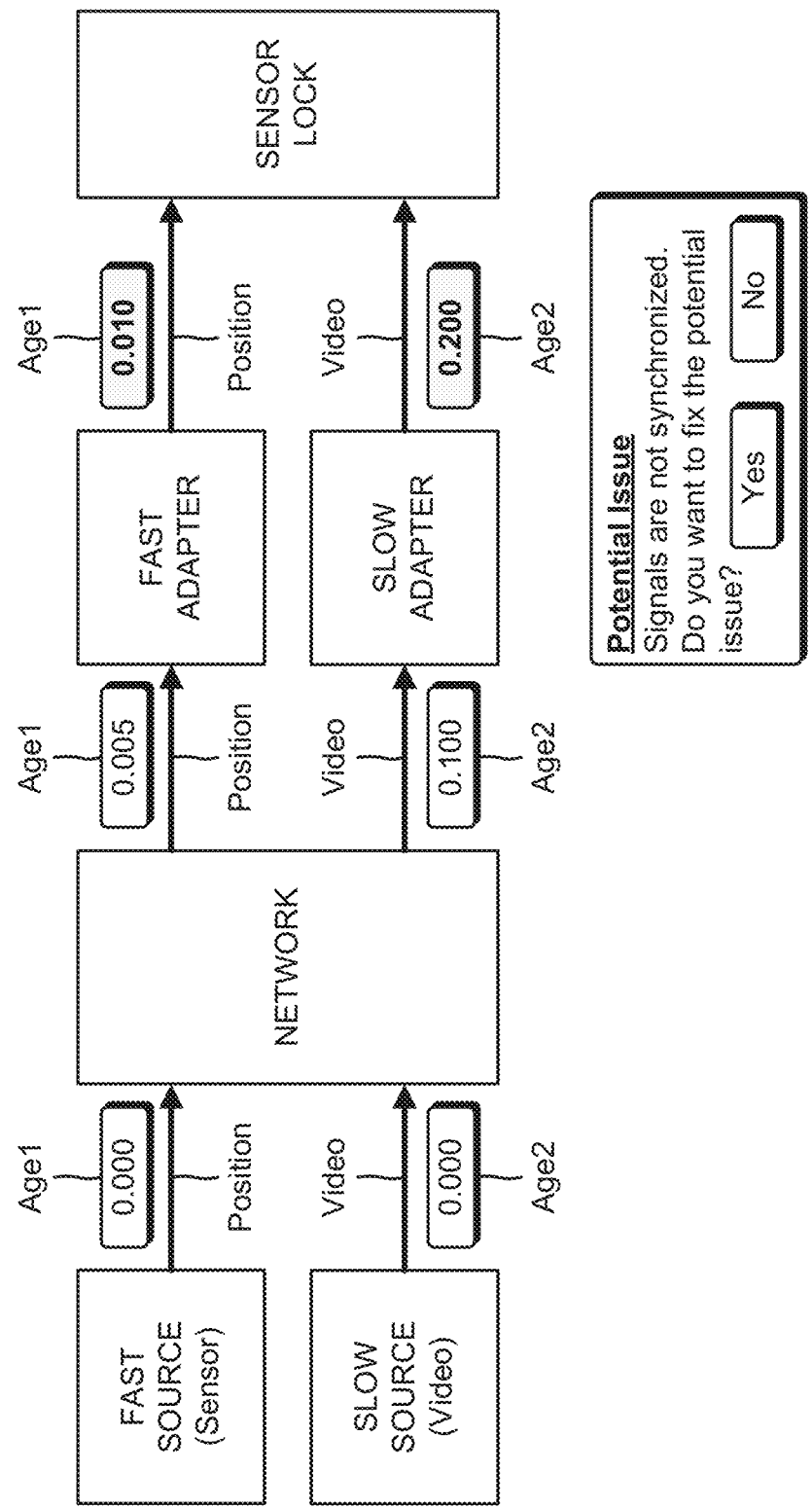

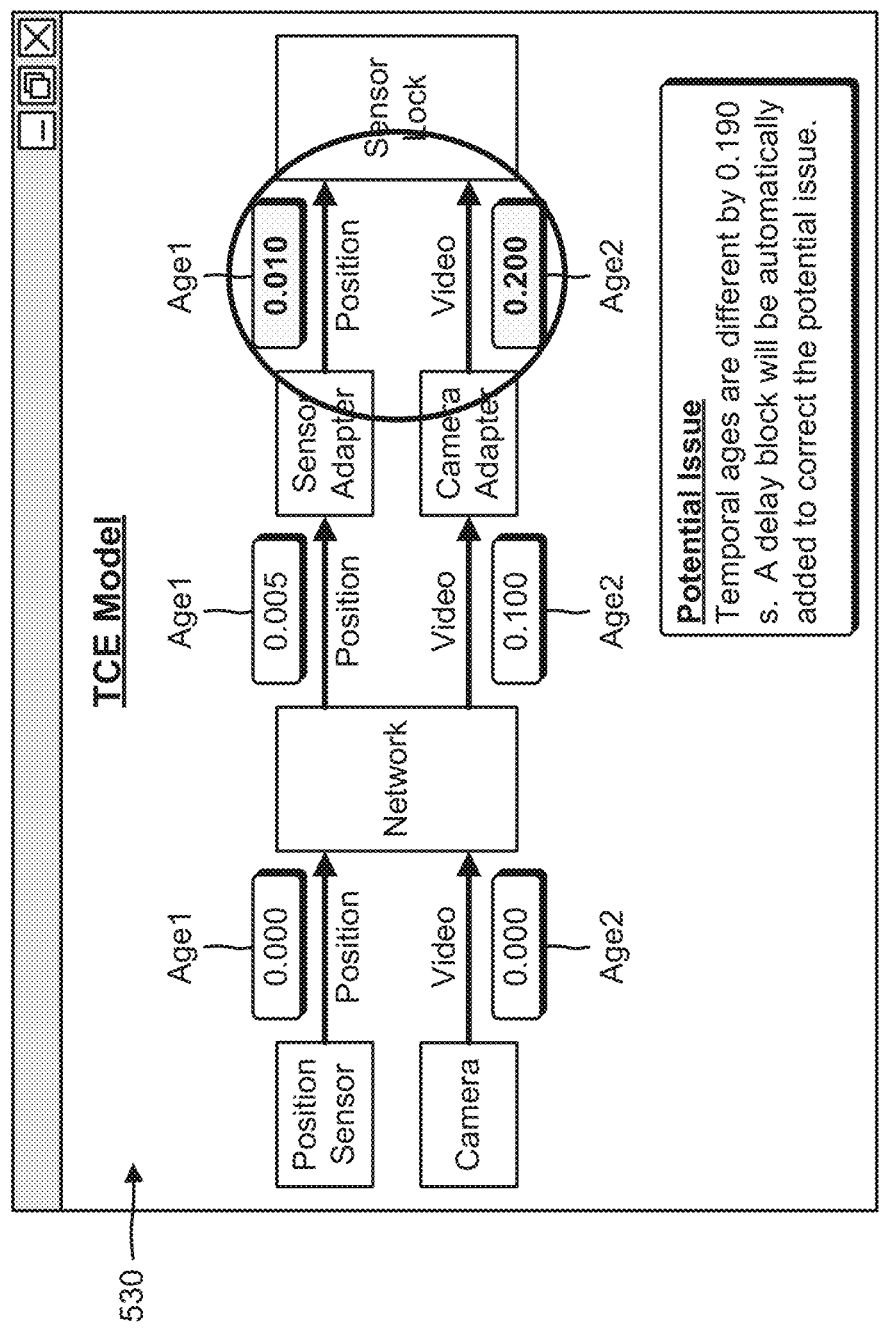

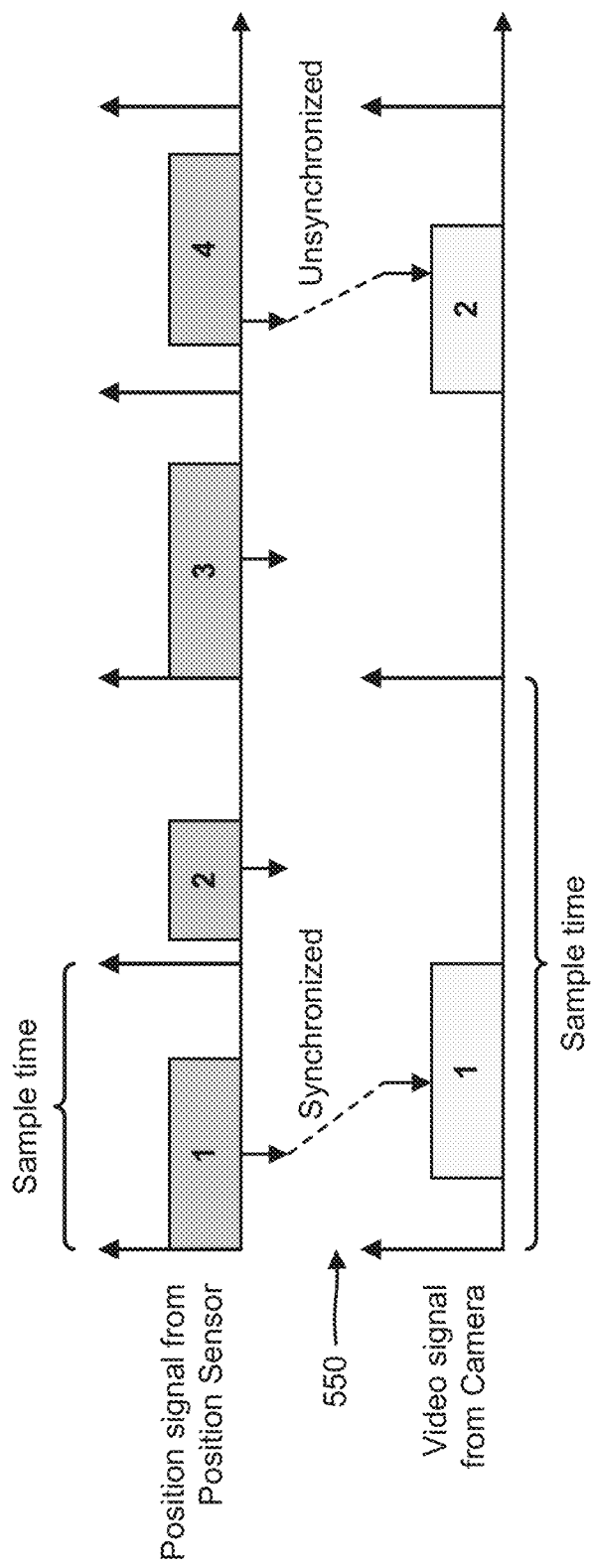

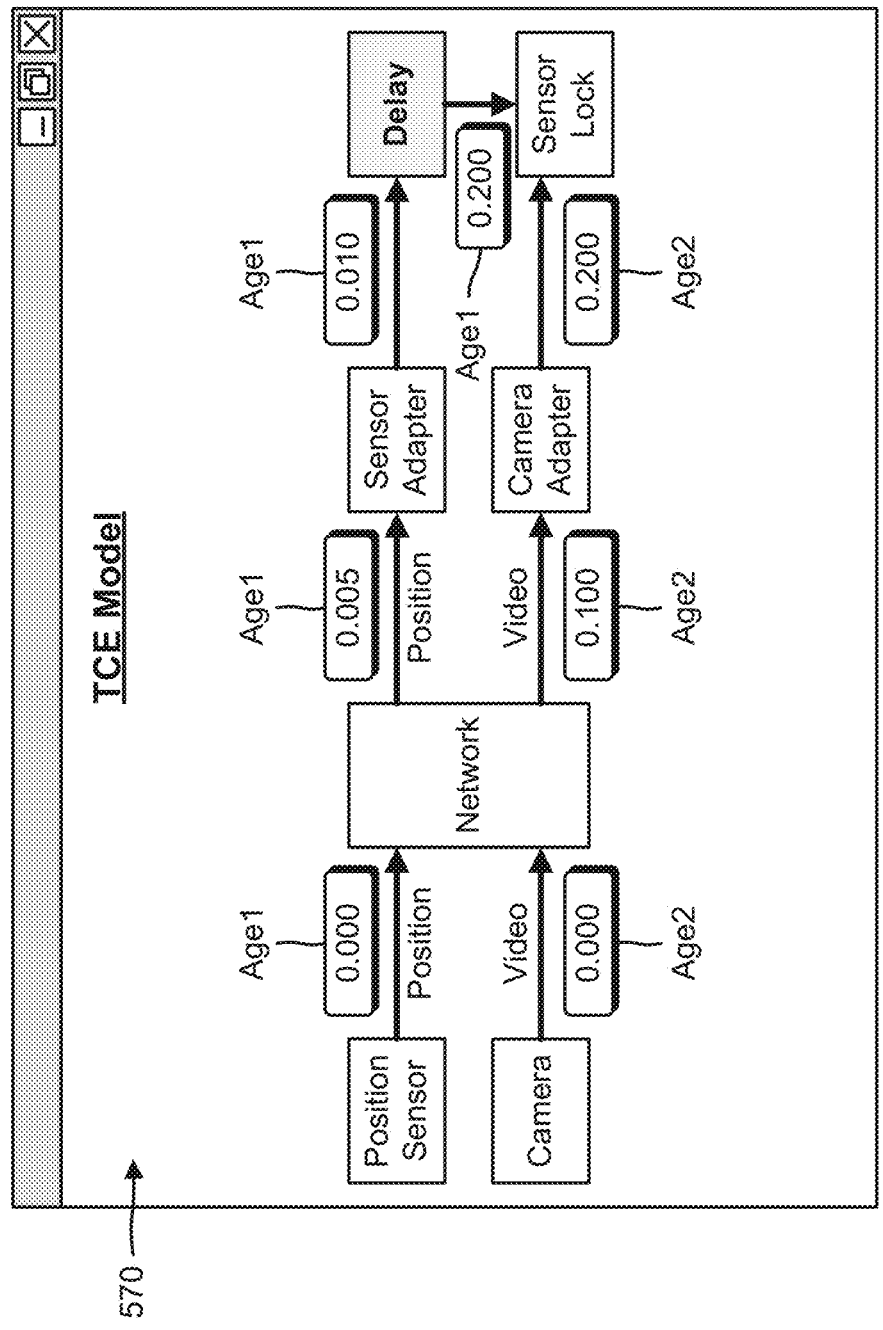

IDENTIFICATION AND CORRECTION OF TEMPORAL AGES IN SEPARATE SIGNAL PATHS OF A GRAPHICAL MODEL

RELATED APPLICATION

This application claims priority under 35 U.S.C. § 119 based on U.S. Provisional Patent Application Nos. 61/770,763 and 61/770,767, filed Feb. 28, 2013, the disclosures of which are incorporated by reference herein in their entireties.

BRIEF DESCRIPTION OF THE DRAWINGS

FIGS. 1A and 1B are diagrams of an overview of an example implementation described herein;

FIGS. 5A-5H are diagrams of an example relating to the example process shown in FIG. 4.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, for example, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, a matrix, a dynamically-typed language, etc. as basic elements.

The TCE may generate models, such as a textual model; a graphical model with one or more model elements (e.g., blocks), one or more input signals (e.g., data), and one or more output signals (e.g., data); a combination of a textual model and a graphical model; etc. Each of the model elements may include a representation (e.g., a block) of a physical device, a subsystem, another model, etc. of a system being modeled.

In some models, signals may be generated from various source blocks and may be combined in select subsystems. Data from the signals may include substantially different temporal ages since the data comes from different source blocks, with different sample time periods, and the signals experience time delays in the model. A temporal age may include an accumulation of time from a starting point which may be based on delays in a system. In some implementations, the delays may be based on communication between tasks with certain sample time periods. For example, a video stream block may include a low sample time period (e.g., 200 milliseconds (ms)) and a location measurement block may a high sample time period (e.g., 2 ms). If the signals from these two blocks are combined in a location detection subsystem that sets a particular location based on an analysis of the video stream, the subsystem may use a location measurement that corresponds to captured images of the video stream. However, the signals may include different sample times which may result in different temporal ages for the signals. The different sample times and temporal ages of the signals may make it difficult for the location detection subsystem to synchronize the location measurement with the video stream. It may be difficult to synchronize the sample times and the temporal ages for at least two signals that converge or are used in a location detection system. It also may be difficult to manually identify the temporal ages throughout the model.

Figure 1B:
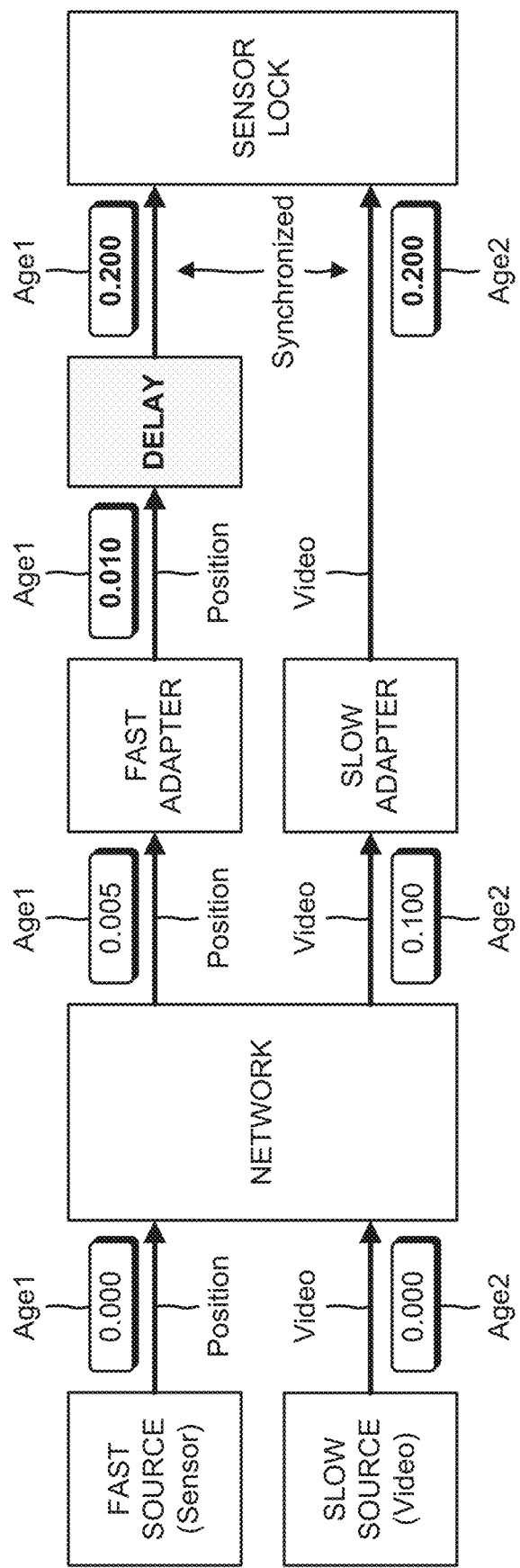

FIGS. 1A and 1B are diagrams of an overview of an example implementation 100 described herein. A user may utilize a TCE of a computing device to create a model, as shown in FIG. 1A. The model may include a fast source block and a slow source block. The fast source block may include a representation of a position sensor that senses a position associated with a physical device (e.g., an air pump, a nozzle motor, etc.). The fast source block may sample a position signal of the physical device with a high sample time (e.g., 5 ms). The slow source block may include a representation of a video camera that captures images of the physical device. The slow source block may sample a video signal of the video camera with a low sample time (e.g., 100 ms). The fast source block may provide the position signal to a network block, and the slow source block may provide the video signal to the network block. The fast source block may not create a delay in the position signal and, thus, a temporal age (e.g., Age1) associated with the position signal may remain at an initial time (e.g., 0.000 seconds). The slow source block may not create a delay in the video signal and, thus, a temporal age (e.g., Age2) associated with the video signal may remain at an initial time (e.g., 0.000 seconds). In some implementations, the source blocks may introduce delays in the signals, which may cause the temporal ages to include initial times greater than zero. In some implementations, the TCE may, automatically, or when instructed by the user, track the temporal ages of the position signal and the video signal and display the temporal ages. In some implementations, the position signal may be independent of the video signal when paths of the signals do not share a common point before a temporal age determination.

As further shown in FIG. 1A, the network block may include a representation of a processing component that receives the position signal and the video signal. The network block may create a delay of one sample time in the position signal and the video signal. For example, the network block may increase the temporal age (e.g., Age1) of the position signal by 0.005 seconds from the initial time (e.g., 0.000 seconds). The network block may increase the temporal age (e.g., Age2) of the video signal by 0.100 seconds from the initial time (e.g., 0.000 seconds). The network block may provide the position signal to a fast adapter block, and may provide the video signal to a slow adapter block. The fast adapter block may include a representation of an adapter that processes the position signal for a sensor lock block. The slow adapter block may include a representation of an adapter that processes the video signal for the sensor lock block.

The fast adapter block may create a delay of one sample time in the position signal. For example, the fast adapter block may increase the temporal age (e.g., Age1) of the position signal by 0.005 second so that the temporal age of the position signal becomes 0.010 seconds. The slow adapter block may create a delay of one sample time in the video signal. For example, the slow adapter block may increase the temporal age (e.g., Age2) of the video signal by 0.100 seconds so that the temporal age of the video signal becomes 0.200 seconds. The fast adapter block may provide the position signal to the sensor lock block, and the slow adapter block may provide the video signal to the sensor lock block, as further shown in FIG. 1A. The sensor lock block may include a representation of a location detection subsystem that sets a particular position of the physical device based on the position signal and the video signal.

As further shown in FIG. 1A, the TCE may determine whether there is a difference between the temporal ages of the position signal and the video signal at a block (e.g., the sensor lock block) that utilizes the position signal and the video signal. If the TCE determines that there is a difference between the temporal ages, the TCE may cause the computing device to display an indication of a potential issue or undesired situation with the model. For example, as shown in FIG. 1A, the TCE may cause the computing device to display information indicating that the position signal and the video signal are not synchronized or consistent (e.g., because of the different temporal ages), and may highlight (e.g., with color, fonts, shading, and/or other effects) the temporal ages entering the sensor lock block. The TCE may also cause the computing device to display information requesting whether the user wants to correct the potential issue with the signals. In some implementations, the TCE may automatically correct the potential issue with the signals, without user confirmation, notification, etc.

If the user elects to correct the potential issue with the signals, the TCE may determine a correction based on the difference in the temporal ages. For example, as shown in FIG. 1B, the TCE may insert a delay block in the model between the fast adapter block and the sensor lock block. The delay block may provide a delay that increases the temporal age (e.g., Age 1) of the position signal by an amount (e.g., 0.190 seconds) that enables the temporal age of the position signal to match the temporal age (e.g., Age2) of the video signal. As further shown in FIG. 1B, the TCE may cause the computing device to display information indicating that the temporal ages are the same (e.g., 0.200 seconds) and that the signals are synchronized. Once the position signal and the video signal are synchronized, the sensor lock block may correctly set the particular position of the physical device based on the position signal and the video signal.

Such an arrangement may enable a user of the TCE to receive information about the temporal ages of separate signals that are utilized in a particular subsystem of a model in the TCE. The TCE may infer the temporal ages based on sample times, sample time transitions, worst case execution times, etc. that occur related to domain transitions (e.g., from a physical or physics model to a network and information model). The arrangement may enable the user to see any differences in the temporal ages, and may automatically, or when instructed by the user, adjust and/or correct the temporal age differences. In some implementations, the temporal ages may be calculated with a starting point based on a transition between domains (e.g., a physical domain and a computational domain).

Figure 2:
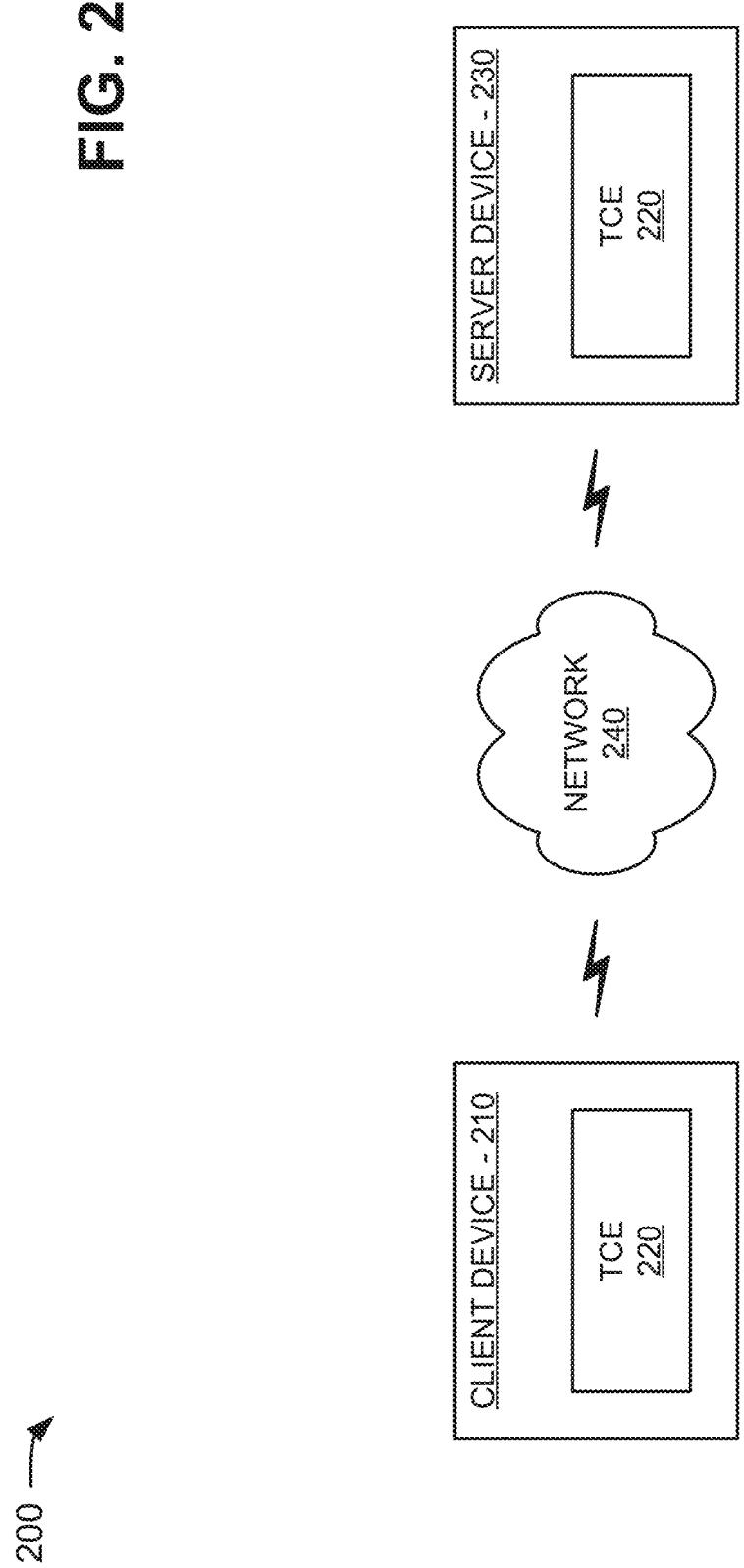
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, for example, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations.

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); a graphically-based environment (e.g., Simulink@ software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

TCE 220 may include a modeling system that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include model elements, such as blocks and/or ports. The relationships may include model elements, such as lines (e.g., connector lines) and references (e.g., textual labels). The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally specific or consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. In some implementations, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

In some implementations, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

In some implementations, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
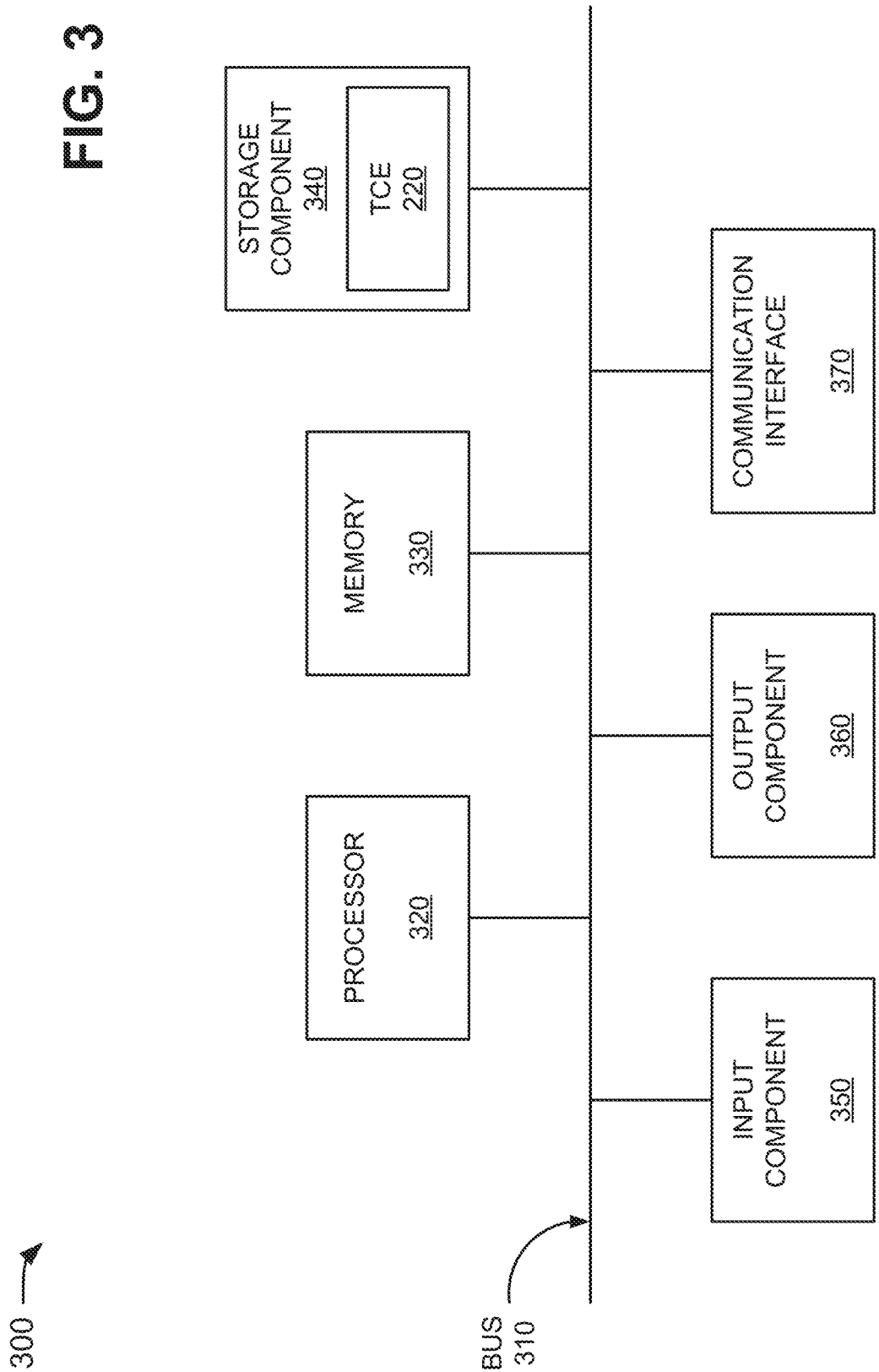
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
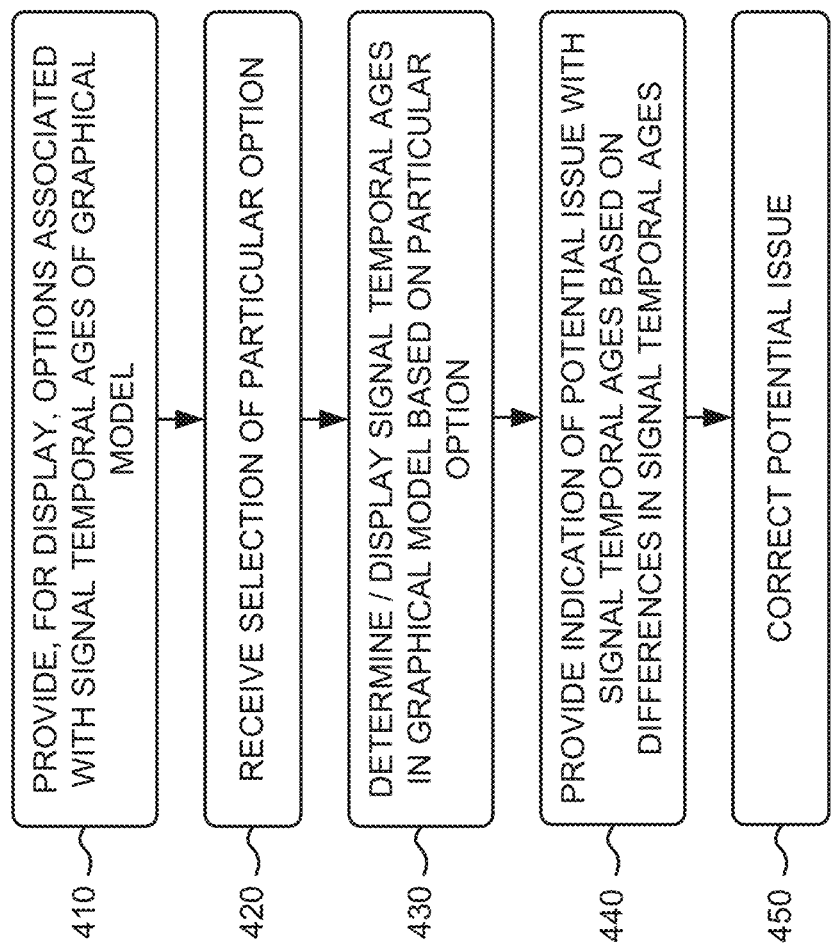
FIG. 4 is a flow chart of an example process for tracking signal temporal ages of a graphical model and adjusting selected differences in signal temporal ages.

FIG. 4 is a flow chart of an example process 400 for tracking signal temporal ages of a graphical model and adjusting selected differences in signal temporal ages. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include providing, for display, options associated with signal temporal ages of a graphical model (block 410). For example, TCE 220 may enable a user of client device 210 to create a graphical model or to instruct client device 210 to receive the graphical model from another source (e.g., server device 230, a CD-ROM, a flash memory, etc.). In some implementations, the graphical model may include one or more model elements (e.g., blocks), one or more input signals (e.g., data), and one or more output signals (e.g., data). Each of the model elements may include a representation (e.g., a block) of a physical device, a subsystem, another model, etc. of a system being modeled. In some implementations, signals may be provided from various source blocks that are to be combined for utilization in a particular block. Data from the signals may include different temporal ages since the data comes from different source blocks, with different sample time periods, and the signals experience temporal aging in the model.

In some implementations, TCE 220 may cause client device 210 to display options associated with the signal temporal ages of the graphical model. For example, client device 210 may display an option to determine the temporal ages of the signals in the graphical model and display the determined signal temporal ages in the graphical model. Client device 210 may display an option to determine the signal temporal ages, display the determined signal temporal ages, and display any characteristics of or potential issues with the determined signal temporal ages. Client device 210 may display an option to determine the signal temporal ages, display the determined signal temporal ages, and automatically identify, address, adjust, etc. any potential issues with the determined signal temporal ages. In some implementations, client device 210 may display one or more of the aforementioned options and/or other options associated with the signal temporal ages.

As further shown in FIG. 4, process 400 may include receiving a selection of a particular option (block 420). For example, a user of client device 210 may utilize a selection mechanism (e.g., a mouse, a touch screen, etc.) to select a particular option from the displayed options associated with the signal temporal ages. In some implementations, the user may select the option to determine the signal temporal ages of the graphical model and display the determined signal temporal ages in the graphical model. In some implementations, the user may select the option to determine the signal temporal ages, display the determined signal temporal ages, and display any potential issues with the determined signal temporal ages. In some implementations, the user may select the option to determine the signal temporal ages, display the determined signal temporal ages, and automatically identify, address, adjust, etc. any potential issues with the determined signal temporal ages.

As further shown in FIG. 4, process 400 may include determining and displaying signal temporal ages in the graphical model based on the particular option (block 430). For example, based on the user selecting one of the options associated with the signal temporal ages, TCE 220 may determine temporal ages associated with the signals provided in the graphical model. In some implementations, TCE 220 may identify sample times associated with the signals and may identify model constructs (e.g., tasks introducing delays, blocks introducing delays, etc.) of the graphical model that may produce time delays (e.g., rate transitions) in the signals. Based on the identified sample times and time delays, TCE 220 may determine the signal temporal ages at any point in the graphical model.

In some implementations, TCE 220 may set a temporal age of a signal produced by a source block, of the graphical model, to zero, and may increment the temporal age any time a delay occurs at other blocks in the graphical model. For example, assume that a source block has a sample time of 0.3 seconds and produces a source signal. Further, assume that a particular block of the graphical model creates a delay of one sample time in the source signal. In such a situation, TCE 220 may increment the temporal age of the source signal by 0.3 seconds at the particular block. In another example, assume that TCE 220 determines that a first signal of the graphical model has a sample time of five (5) seconds, and that a second signal of the graphical model has a sample time of ten (10) seconds. Also assume that TCE 220 determines that the first and second signals are provided to a first block of the graphical model that creates a temporal age of one sample time for each of the signals, and are provided to a second block that creates a temporal age of two sample times for each of the signals. In this example, the first signal will have a temporal age of fifteen (15) seconds (e.g., 5 seconds from the first block and 10 seconds from the second block), and the second signal will have a temporal age of thirty (30) seconds (e.g., 10 seconds from the first block and 20 seconds from the second block).

In some implementations, TCE 220 may cause client device 210 to display the determined signal temporal ages in the graphical model. In some implementations, each signal temporal age may be displayed adjacent to a corresponding signal (e.g., represented by an arrow) of the graphical model. In some implementations, each signal temporal age may be displayed when the user hovers over (e.g., with a mouse) the arrow representing the corresponding signal. In some implementations, the signal temporal ages may be displayed in a particular color, font, with special effects, etc. so that the signal temporal ages may be easily identified in the graphical model. In some implementations, TCE 220 may determine and/or display signal temporal ages associated with the entire graphical model and/or associated with one or more portions of the graphical model. For example, TCE 220 may allow the user to select a particular portion of the graphical model for which signal temporal ages are to be determined. In this example, TCE 220 may determine the signal temporal ages for only the selected portion of the graphical model. In some implementations, TCE 220 may indicate a source of where a temporal age starts to accumulate. For example, if there is a domain transition and the temporal age starts to accumulate at the domain transition, TCE 220 may identify the domain transition so that the user has a reference point for the temporal age accumulation.

As further shown in FIG. 4, process 400 may include providing an indication of a potential issue with the signal temporal ages based on differences in the signal temporal ages (block 440). For example, if the user selects the option to determine the signal temporal ages, display the determined signal temporal ages, and display any potential issues with the determined signal temporal ages, TCE 220 may determine particular blocks of the graphical model. In some implementations, the particular blocks may include blocks that have two or more input signals that need to be synchronized. For example, a subsystem block may need to synchronize a location measurement from a sensor signal with captured images of a video signal. If blocks include input signals that do not need to be synchronized, TCE 220 may determine that such blocks do need to be analyzed for differences in the signal temporal ages. If TCE 220 determines that a block of the graphical model meets the criteria of a particular block, TCE 220 may determine if there are any differences in the signal temporal ages at the particular block. In some implementations, TCE 220 may determine potential issues with one or more determined temporal ages of one or more signals.

In some implementations, when TCE 220 determines that there is a discrepancy between the temporal ages of two signals, TCE 220 may specify that the signals should have a certain relation between their temporal ages (e.g., the same temporal ages or a difference between the temporal ages that is less than a threshold). The relation between the temporal ages may be user configurable, may be provided by TCE 220, and/or may include a default (e.g., the temporal ages must be the same). With such information, the user may determine whether there is an actual problem in the model, and may determine how to resolve the problem (e.g., which may also be user configurable).

In some implementations, if TCE 220 determines that there are no differences in the signal temporal ages at the particular block of the graphical model, TCE 220 may determine that the signals are synchronized at the particular block. If TCE 220 determines that there are differences in the signal temporal ages at the particular block, TCE 220 may determine that the signals are not synchronized at the particular block, and may add a delay to the graphical model, may adjust the sample time to be equivalent for both signals, etc.

In some implementations, if TCE 220 determines that there are differences in the signal temporal ages at a particular block of the graphical model, TCE 220 may cause client device 210 to display an indication of a potential issue with the signal temporal ages. In some implementations, client device 210 may display, in the graphical model, a window or some other mechanism that includes information indicating that there is a potential issue with the signal temporal ages. The potential issue may indicate that the signal temporal ages are different and that the signals are not synchronized. In some implementations, TCE 220 may cause client device 210 to display information requesting whether the user wants to correct the potential issue with the signal temporal ages. In some implementations, TCE 220 may cause client device 210 to display the different signal temporal ages in a manner (e.g., via colors, fonts, blinking text, enlarged text, etc.) that highlights the different signal temporal ages to the user of client device 210. In some implementations, TCE 220 may cause client device 210 to display one or more reference points from which the temporal ages are accumulated.

As further shown in FIG. 4, process 400 may include correcting the potential issue (block 450). For example, if the user selects the option to determine the signal temporal ages, display the determined signal temporal ages, and automatically correct any potential issues with the determined signal temporal ages, TCE 220 may automatically correct the potential issue with the signal temporal ages. In some implementations, TCE 220 may determine the difference in the signal temporal ages, and may create one or more delay blocks that eliminate the difference in the signal temporal ages. For example, assume that a first signal has a temporal age of five (5) seconds at a particular block, and that a second signal has a temporal age of ten (10) seconds at the particular block. In such an example, TCE 220 may create a delay block that creates a delay of five seconds. TCE 220 may add the delay block to the graphical model, before the particular block, so that the delay block increases the temporal age of the first signal by five seconds and makes the temporal ages of both signal equivalent or substantially equivalent (e.g., at ten seconds).

When the signal temporal ages are equivalent, the signals may be synchronized and may be utilized by the particular block of the graphical model. In some implementations, TCE 220 may automatically generate and provide the delay block in the graphical model to automatically correct the potential issue with the signal temporal ages. In some implementations, TCE 220 may suggest a correction to the potential issue with the signal temporal ages when the user elects to correct the potential issue with the signal temporal ages, and the user may accept or reject the suggested correction.

In some implementations, the temporal ages may be based on logical time and/or physical time associated with a graphical model. In some implementations, the user may specify a criterion (e.g., a range, an absolute tolerance, a relative tolerance, etc.) for the temporal ages of the graphical model. For example, the user may select a block of the graphical model for which a temporal age criterion may be applied, and TCE 220 may display an affordance requesting that the user input TCE code to specify a temporal age criterion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
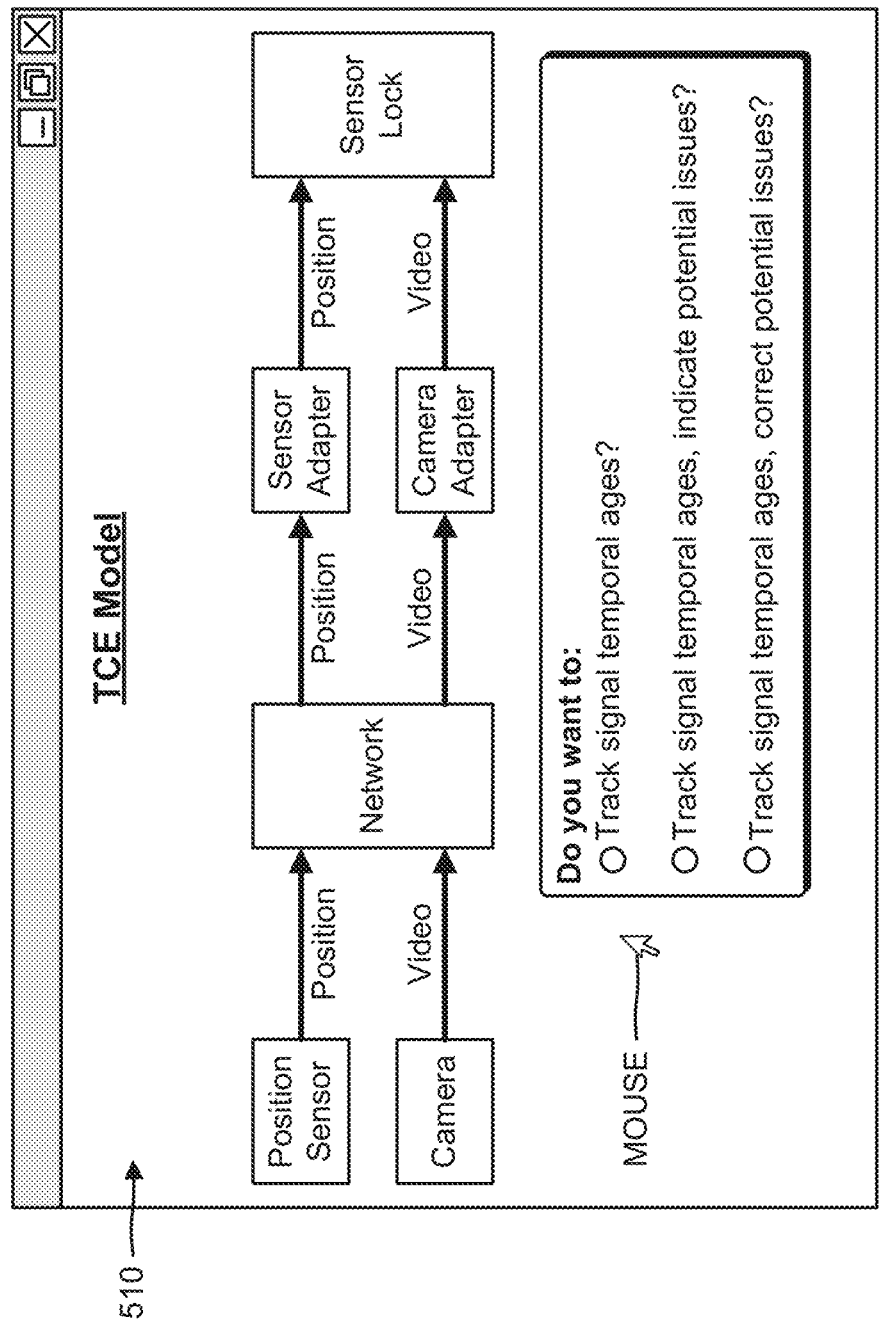

FIGS. 5A-5H are diagrams of an example 500 relating to example process 400 shown in FIG. 4. In example 500, assume that a user of client device 210 utilizes TCE 220 to create a graphical model or to import the graphical model into TCE 220. As shown in FIG. 5A, TCE 220 may cause client device 210 to display the graphical model in a user interface 510. The graphical model may include a position sensor block, a camera block, a network block, a sensor adapter block, a camera adapter block, and a sensor lock block.

The position sensor block may include a representation of a position sensor that senses a position associated with a physical device (e.g., a slider force motor, a nozzle motor, etc.). In example 500, assume that the position sensor block samples a position signal of the physical device with a high rate sample time (e.g., 0.005 seconds). The camera block may include a representation of a video camera that captures images of the physical device. In example 500, assume that the camera block samples a video signal of the video camera with a low rate sample time (e.g., 0.100 seconds). As shown in FIG. 5A, the position sensor block may provide the position signal to the network block, and the camera block may provide the video signal to the network block. In example 500, assume that the position sensor block does not create a delay in the position signal and that the camera block does not create a delay in the video signal.

The network block may include a representation of a processing component that receives the position signal and the video signal. In example 500, assume that the network block creates a delay of one sample time in the position signal and the video signal. As shown in FIG. 5A, the network block may provide the position signal to the sensor adapter block, and may provide the video signal to the camera adapter block. The sensor adapter block may include a representation of an adapter that processes the position signal for the sensor lock block. The camera adapter block may include a representation of an adapter that processes the video signal for the sensor lock block.

In example 500, assume that the sensor adapter block creates a delay of one sample time in the position signal, and that the camera adapter block creates a delay of one sample time in the video signal. As further shown in FIG. 5A, the sensor adapter block may provide the position signal to the sensor lock block, and the camera adapter block may provide the video signal to the sensor lock block. The sensor lock block may include a representation of a location detection subsystem that sets a particular position of the physical device based on the position signal and the video signal.

As further shown in FIG. 5A, TCE 220 may cause client device 210 to display (e.g., in a window or some other display mechanism) a list of options associated with tracking signal temporal ages of the graphical model. The list of options may include an option to determine the signal temporal ages of the graphical model and display the determined signal temporal ages in the graphical model (e.g., Track signal temporal ages); an option to determine the signal temporal ages, display the determined signal temporal ages, and display any potential issues with the determined signal temporal ages (e.g., Track signal temporal ages, indicate potential issues); and an option to determine the signal temporal ages, display the determined signal temporal ages, and automatically correct any potential issues with the determined signal temporal ages (e.g., Track signal temporal ages, correct potential issues). The list of options may also include an option to select one or more reference points from which to start accumulating temporal ages, and/or an option to highlight the one or more reference points. In example 500, assume that the user utilizes a selection mechanism (e.g., a mouse) to select an option from the list of options.

Based on the user selecting any option from the list of options, TCE 220 may determine temporal ages associated with the position signal and the video signal at different points in the graphical model. In example 500, assume that TCE 220 identifies sample times associated with the position signal and the video signal, and identifies blocks of the graphical model that produce temporal ages in the position signal and/or the video signal. For example, TCE 220 may determine that the network block and the sensor adapter block each create a temporal age in the position signal of one sample time (e.g., 0.005 seconds). TCE 220 may determine that the network block and the camera adapter block each create a temporal age in the video signal of one sample time (e.g., 0.100 seconds). Based on the identified sample times and temporal ages, TCE 220 may determine the temporal ages of the position signal and the video signal at any point in the graphical model. In some implementations, the one or more reference points may be specified by the user or inferred by TCE 220 based on the graphical model (e.g., TCE 220 or the user may specify a domain transition boundary as a starting point for calculating the temporal ages).

Figure 5B:
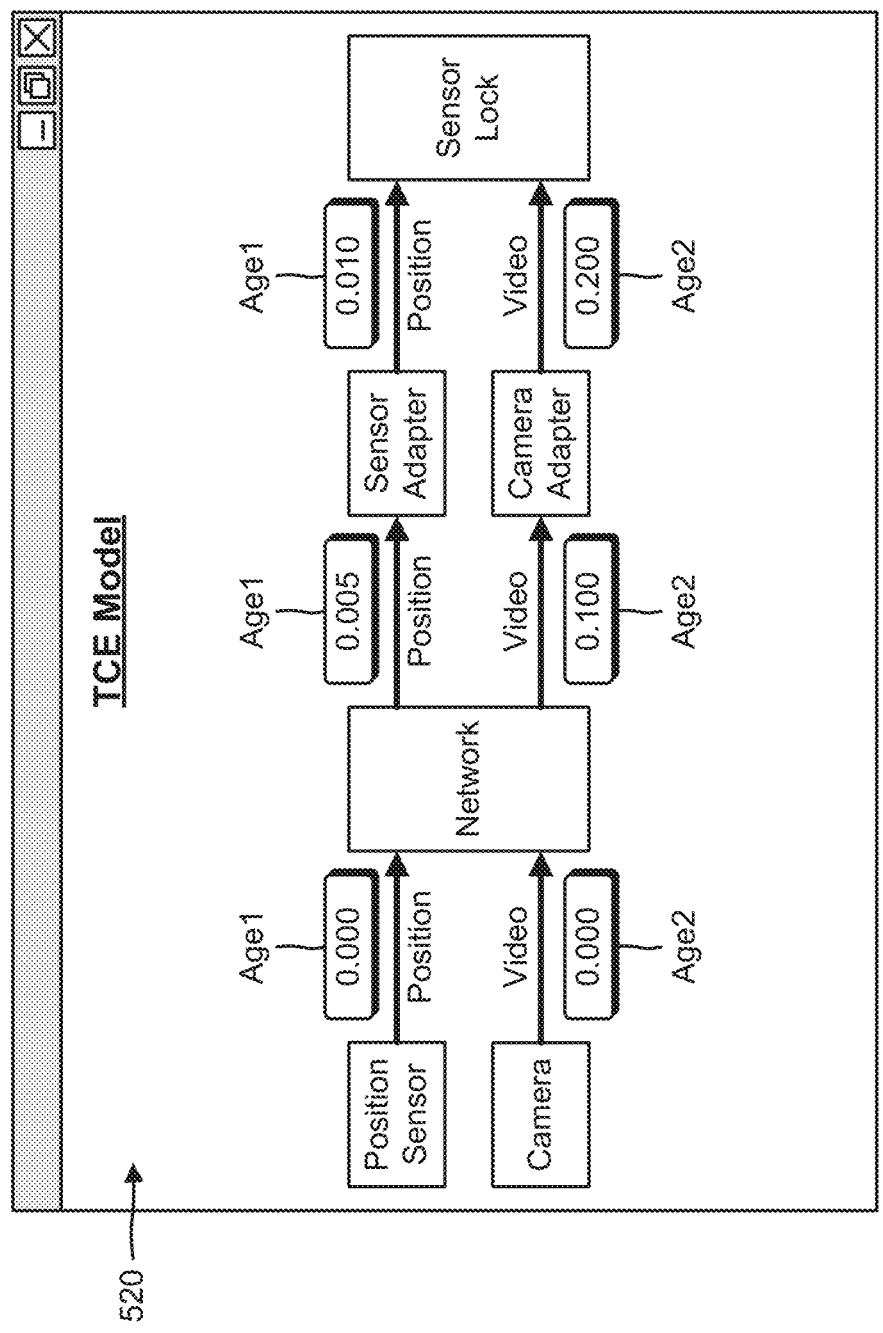

In example 500 and with reference to FIG. 5B, assume that TCE 220 determines that the temporal age (e.g., Age1) of the position signal, provided between the position sensor block and the network block, is 0.000 seconds; that the temporal age of the position signal, provided between the network block and the sensor adapter block, is 0.005 seconds; and that the temporal age of the position signal, provided between the sensor adapter block and the sensor lock block, is 0.010 seconds. Further, assume that TCE 220 determines that the temporal age (e.g., Age2) of the video signal, provided between the position sensor block and the network block, is 0.000 seconds, that the temporal age of the video signal, provided between the network block and the camera adapter block, is 0.100 seconds; and that the temporal age of the video signal, provided between the camera adapter block and the sensor lock block, is 0.200 seconds. TCE 220 may cause client device 210 to display the determined temporal ages (e.g., Age1 and Age2) of the position signal and the video signal at different points in the graphical model, as shown in a user interface 520 of FIG. 5B. As further shown in user interface 520, the signal temporal ages may be displayed adjacent to the position signal and the video signal (e.g., represented by arrows) of the graphical model. This may enable the user of client device 210 to easily track the signal temporal ages throughout the graphical model. In some implementations, the signal temporal ages may be accumulated starting from a certain block type (e.g., sensor block type), and TCE 220 may indicate (e.g., highlight) the certain block as a reference block.

If the user selects the option to determine the signal temporal ages, display the determined signal temporal ages, and display any potential issues with the determined signal temporal ages, TCE 220 may determine if there are any potential issues in the signal temporal ages at particular blocks of the graphical model (e.g., blocks that have two or more input signals that need to be synchronized) based on rules, constraints, scripts, etc. that may be user configurable. In example 500, assume that TCE 220 determines if there are any differences in the signal temporal ages at the sensor lock block since the sensor lock block performs an operation (e.g., locks a position of the physical device) that requires the position signal and the video signal to be synchronized. Alternatively, the user may specify explicitly when there is a potential issue. Thus, the temporal ages of the position signal and the video signal at the sensor lock block should be substantially equal in order for the position signal and the video signal to be synchronized. If TCE 220 determines that there are differences in the signal temporal ages at the sensor lock block, TCE 220 may cause client device 210 to display an indication of a potential issue with the signal temporal ages, as shown in a user interface 530 of FIG. 5C. As further shown in user interface 530, client device 210 may display, in the graphical model, a window that includes information indicating that there is a potential issue with the signal temporal ages. The potential issue may indicate that the temporal ages of the position signal and the video signal are different by 0.190 seconds. The window may further include information indicating that the potential issue will be automatically corrected (e.g., via adding a delay block) or providing a suggested correction with an option for the user to accept the suggested correction. The window may also include which constraints, rules, scripts, etc. are violated, active, selected by the user, etc.

Figure 5D:
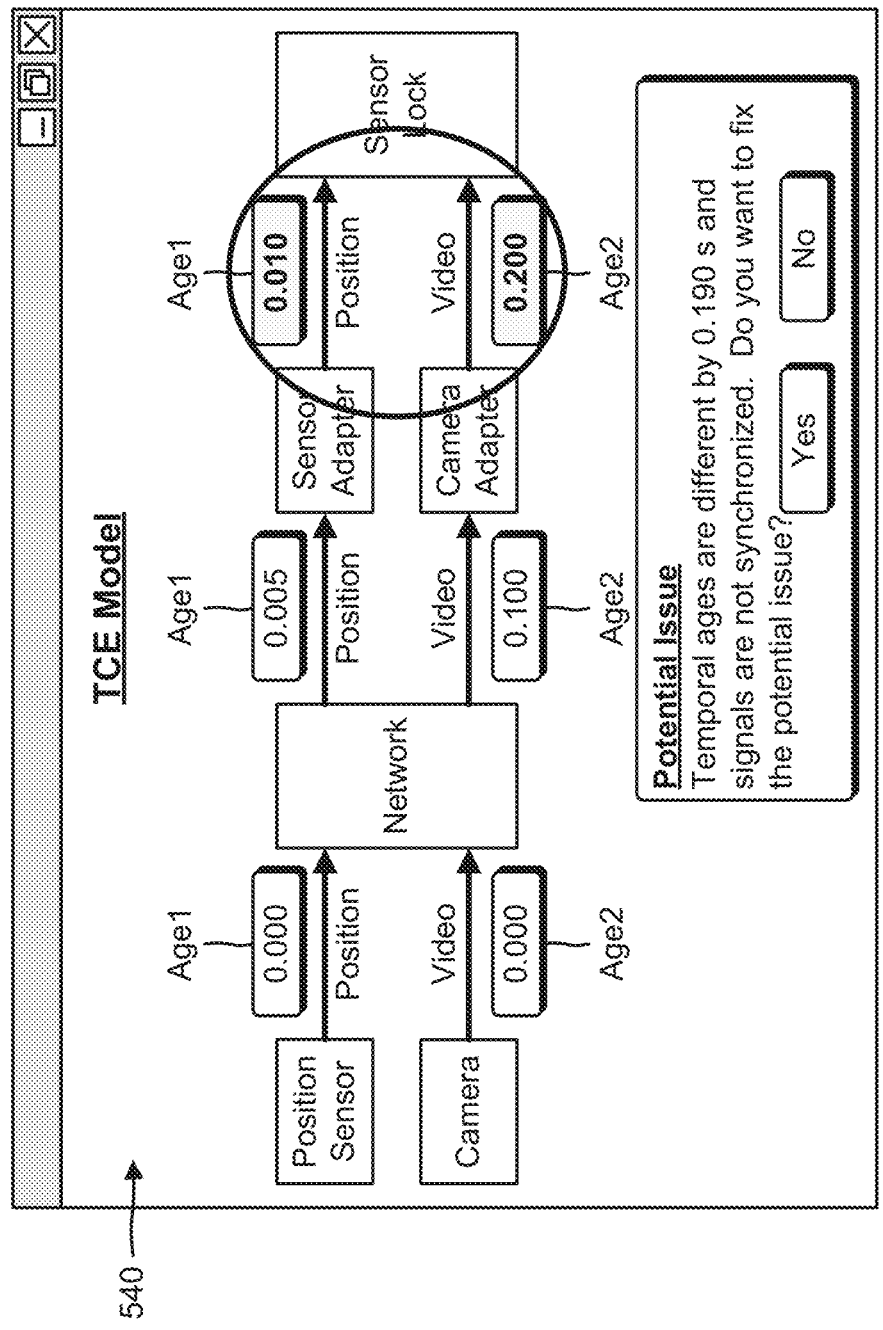

Alternatively, if TCE 220 determines that there are differences in the signal temporal ages at the sensor lock block, TCE 220 may cause client device 210 to display an indication of a potential issue with the signal temporal ages, as shown in a user interface 540 of FIG. 5D. As further shown in user interface 540, client device 210 may display, in the graphical model, a window that includes information indicating that the signal temporal ages are different (e.g., by 0.190 seconds) and that the signals are not synchronized. The window may also include information requesting whether the user wants to correct the potential issue with the signal temporal ages (e.g., Do you want to fix the potential issue?), and may include a suggested correction with an option for the user to accept the suggested correction.

FIG. 5E provides an example of how the position signal and the video signal become unsynchronized. As indicated by reference number 550 in FIG. 5E, data from the position signal and the video signal may be synchronized initially (e.g., for data 1 of the position signal and the video signal). However, since the position sensor block includes a faster sample time than the sample time of the camera block, the position signal may obtain data 2 and data 3 before the video signal obtains data 2. As further shown in FIG. 5E, data 2 of the video signal may incorrectly match up with data 4 of the position signal (e.g., rather than data 2 of the position signal), which creates unsynchronized data. This may create a need for buffering the data of the position signal in order to avoid non-determinism (e.g., when it is not known from which sample time that data is associated).

Figure 5F:
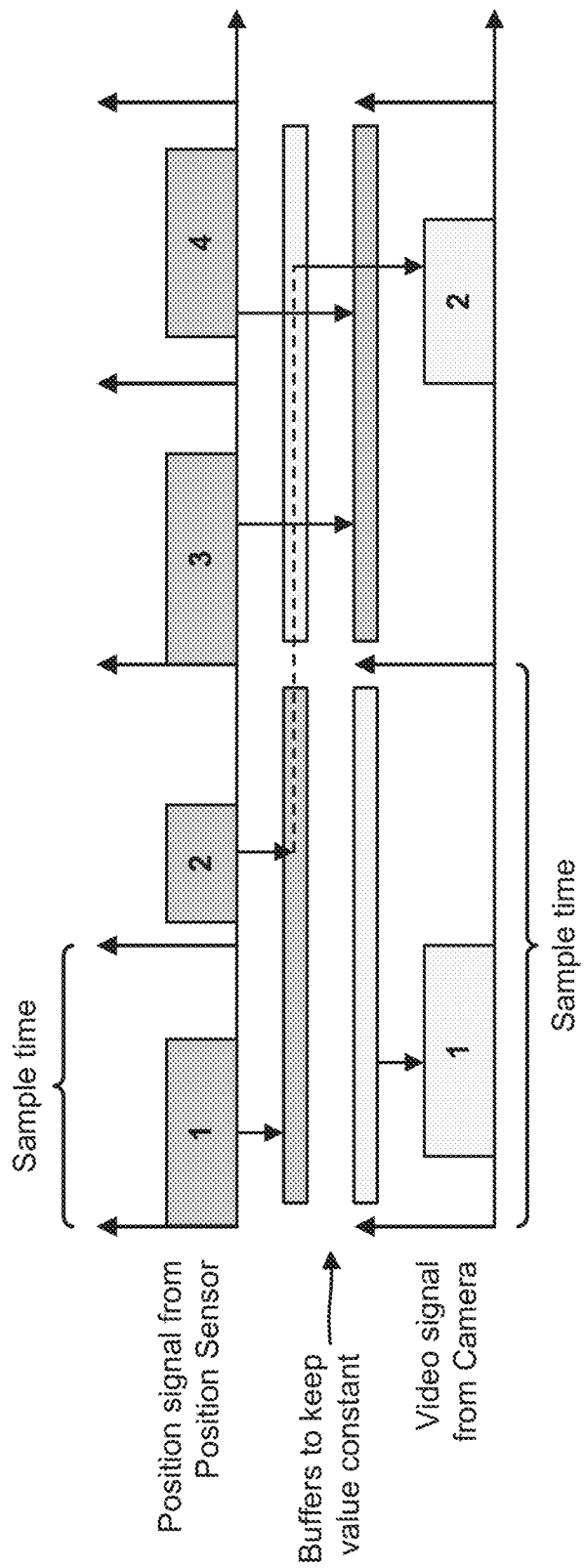

FIG. 5F provides an example of how to buffer data from the position signal and the video signal. For example, the data of the position signal may be written to a first memory location (e.g., buffer), and the video signal may read from a second, different buffer during the first sample time of the video signal. During the second sample time of the video signal, the data from the position signal may be written to the second buffer, and the video signal may read from the first buffer. This double buffering scheme may guarantee that the data of the position signal is written to the buffers by the last execution of the sample time. However, the double buffering scheme may cause the video signal to read the last written data of the position signal from a previous sample time, which introduces a full sample time delay into the graphical model.

In example 500, further assume that the user elects to automatically correct the potential issue with the signal temporal ages or that the user elects to correct the potential issue with the signal temporal ages (e.g., by selecting a "Yes" button in the window of user interface 540, FIG. 5D). Based on the user's election to correct the potential issue, TCE 220 may determine a recommended correction that may synchronize the position signal and the video signal at the sensor lock block. In example 500, assume that the recommended correction includes providing a delay block between the sensor adapter block and the sensor lock block so that the difference in the signal temporal ages (e.g., Age1 and Age2) may be eliminated and so that the position signal and the video signal may be synchronized at the sensor lock block. The delay block may add a delay (e.g., of 0.190 seconds) to the position signal so that the temporal age (e.g., Age1) of the position signal increases from 0.010 seconds to 0.200 seconds. Thus, the delay block may cause the temporal ages of the position signal and the video signal to be equivalent at the sensor lock block.

Figure 5G:
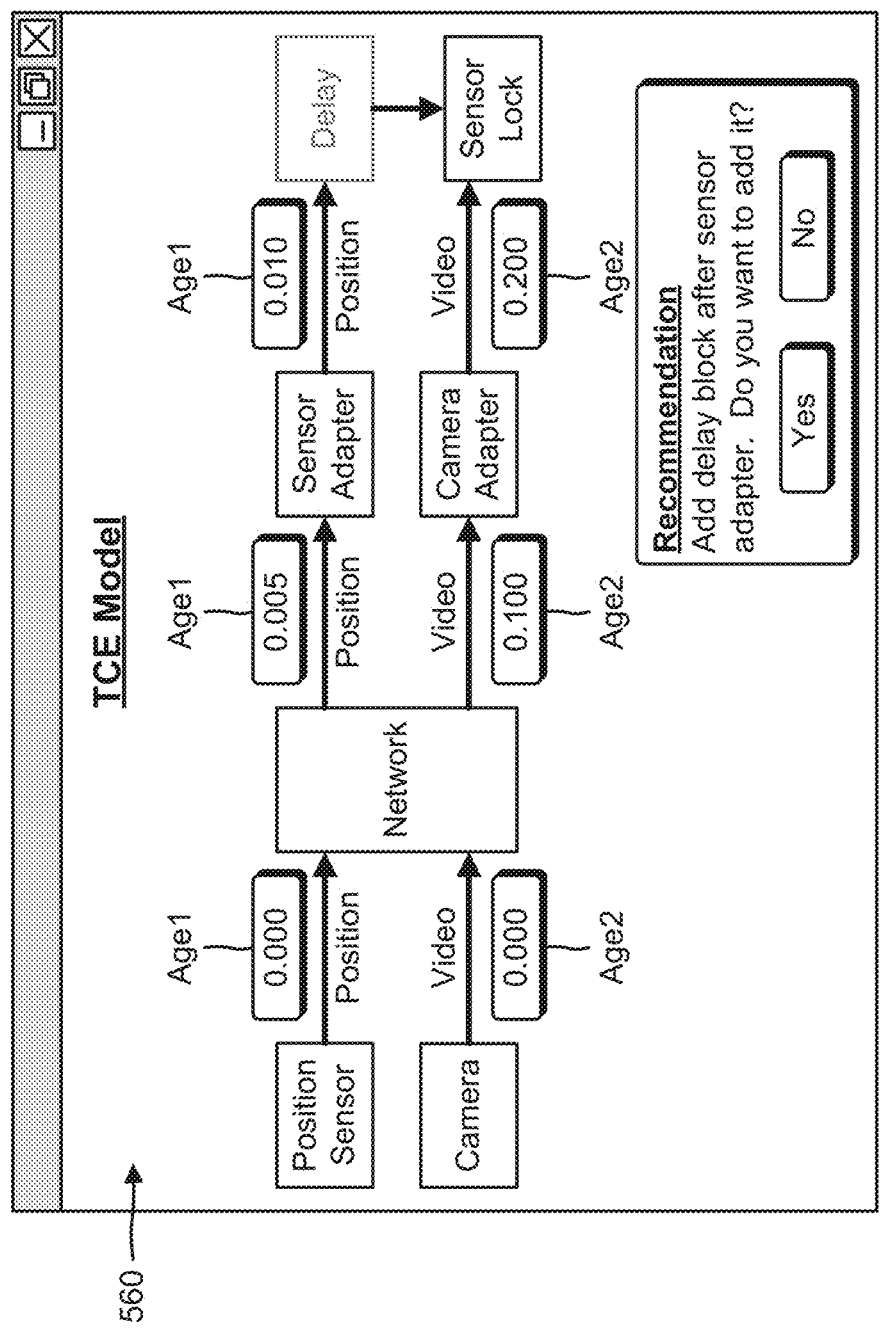

As shown in a user interface 560 of FIG. 5G, TCE 220 may cause client device 210 to display, to the user (e.g. in a window), the recommended correction (e.g., Add delay block after the sensor adapter block) along with information requesting user permission to implement the recommended correction in the graphical model (e.g., Do you want to add it?).

If the user elects to add the delay block between the sensor adapter block and the sensor lock block (e.g., by selecting a "Yes" button in the recommendation window), TCE 220 may add the delay block between the sensor adapter block and the sensor lock block, as shown in a user interface 570 of FIG. 5H, and may calculate the temporal age (e.g., Age1) of the position signal between the delay block and the sensor lock block. In example 500, assume that the delay block adds a delay of 0.190 seconds to the temporal age of the position signal so that the temporal age of the position signal matches the temporal age (e.g., Age2) of the video signal at the sensor lock block (e.g., 0.200 seconds), as further shown in user interface 570 of FIG. 5H. When the temporal ages of the position signal and the video signal are equivalent, the position signal and the video signal may be synchronized and may be utilized by the sensor lock block of the graphical model.

As indicated above, FIGS. 5A-5H are provided merely as an example. Other examples are possible and may differ from what was described with regard to FIGS. 5A-5H.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    determining a temporal age of a first signal and a temporal age of a second signal provided in a graphical model,
        the temporal age of the first signal being determined based on a first accumulation of time from a first point of reference until the first signal reaches a particular block, of the graphical model, that utilizes the first signal and the second signal,
        the temporal age of the second signal being determined based on a second accumulation of time from a second point of reference until the second signal reaches the particular block,
        the first signal being different than the second signal,
        the first point of reference and the second point of reference each being at least one of:
            a transition between a physical domain and a computational domain,
            a transition between a physical model or a physics model and at least one of a network model or an information model, or
            a transition between sample times, and
        the determining the temporal age of the first signal and the temporal age of the second signal being performed by a device;
    determining, based on the temporal age of the first signal and the temporal age of the second signal, whether the first signal is consistent with the second signal at the particular block,
        the determining whether the first signal is consistent with the second signal being performed by the device;
    selectively providing, for display, a first indication indicating that the first signal is consistent with the second signal, or a second indication indicating that the first signal is not consistent with the second signal,
        the first indication being provided, for display, when the temporal age of the first signal is substantially equivalent to the temporal age of the second signal,
        the second indication being provided, for display, when the temporal age of the first signal is substantially not equivalent to the temporal age of the second signal, and
        the selectively providing, for display, the first indication or the second indication being performed by the device;
    determining, when the temporal age of the first signal is substantially not equivalent to the temporal age of the second signal, a correction that causes the temporal age of the first signal to be substantially equivalent to the temporal age of the second signal,
        the determining the correction being performed by the device;
    implementing the correction in the graphical model to generate a modified graphical model and cause the temporal age of the first signal to be substantially equivalent to the temporal age of the second signal in the modified graphical model,
        the implementing the correction being performed automatically by the device or being performed based on user input; and
    utilizing, by the particular block in the modified graphical model, the first signal and the second signal based on the temporal age of the first signal being substantially equivalent to the temporal age of the second signal,
        the utilizing the first signal and the second signal being performed by the device.

2. The method of claim 1, further comprising:
    providing, for display, information describing the correction.

3. The method of claim 1, further comprising:
    receiving, prior to the determining the correction, a request to automatically implement the correction; and
    automatically performing the implementing the correction in the graphical model based on the request.

4. The method of claim 1, where the correction includes providing a delay block in the graphical model that causes the temporal age of the first signal to be substantially equivalent to the temporal age of the second signal.

5. The method of claim 1, where:
    the first signal is sampled at a first sample time,
    the second signal is sampled at a second sample time, and
    the first sample time is different than the second sample time.

6. The method of claim 1, further comprising:
    providing, for display, options associated with signal temporal ages of the graphical model;
    receiving a selection of a particular option from the options; and
    determining the temporal age of the first signal and the temporal age of the second signal based on the particular option.

7. The method of claim 1, where the particular block includes a block of the graphical model that requires the first signal to be synchronized with the second signal.

8. The method of claim 1, wherein the graphical model is generated by a technical computing environment, the method further comprising:
    automatically selecting, by the technical computing environment, a first source of the first signal and a second source of the second signal from the graphical model.

9. The method of claim 8, further comprising:
    providing a first source indication of the first source in the graphical model; and
    providing a second source indication of the second source in the graphical model.

10. The method of claim 1, further comprising:
receiving a selection of a first source of the first signal and a second source of the second signal from the graphical model.

11. The method of claim 1, further comprising:
receiving a criterion for comparing the temporal age of the first signal and the temporal age of the second signal.

12. The method of claim 1, where at least one of the first point of reference or the second point of reference is the transition between the physical domain and the computational domain.

13. The method of claim 1, where at least one of the first point of reference or the second point of reference is the transition between the physical model or the physics model and the at least one of the network model or the information model,
the network model including a network block.

14. The method of claim 1, where at least one of the first point of reference or the second point of reference is the transition between sample times.

15. The method of claim 1, where at least one of the temporal age of the first signal or the temporal age of the second signal is based on a delay introduced into the graphical model by using a double buffering scheme to buffer data from the first signal and data from the second signal.

16. A device, comprising:
one or more processors to:
determine a temporal age of a first signal and a temporal age of a second signal provided in a graphical model,
the temporal age of the first signal being determined based on a first accumulation of time from a first point of reference until the first signal reaches a particular block, of the graphical model, that utilizes the first signal and the second signal,
the temporal age of the second signal being determined based on a second accumulation of time from a second point of reference until the second signal reaches the particular block,
the first signal being different than the second signal, and
the first point of reference and the second point of reference each being at least one of:
a transition between a physical domain and a computational domain,
a transition between a physical model or a physics model and at least one of a network model or an information model, or
a transition between sample times;
provide, for display and in the graphical model, the temporal age of the first signal and the temporal age of the second signal;
determine, based on the temporal age of the first signal and the temporal age of the second signal, whether the first signal is consistent with the second signal at the particular block; and
selectively:
provide, for display, a first indication indicating that the first signal is consistent with the second signal, at the particular block, when the temporal age of the first signal is substantially equivalent to the temporal age of the second signal, or
provide, for display, a second indication indicating that the first signal is not consistent with the second signal, at the particular block, when the temporal age of the first signal is substantially not equivalent to the temporal age of the second signal;
determine, when the temporal age of the first signal is substantially not equivalent to the temporal age of the second signal, a correction that causes the temporal age of the first signal to be substantially equivalent to the temporal age of the second signal;
implement the correction in the graphical model to generate a modified graphical model and cause the temporal age of the first signal to be substantially equivalent to the temporal age of the second signal in the modified graphical model; and
utilize, by the particular block in the modified graphical model, the first signal and the second signal based on the temporal age of the first signal being substantially equivalent to the temporal age of the second signal.

17. The device of claim 16, where the one or more processors are further to:
provide, for display, information associated with the correction.

18. The device of claim 16, where the one or more processors are further to:
receive, prior to the determine the correction, a request to automatically implement the correction, and
automatically perform the implement the correction in the graphical model based on the request.

19. The device of claim 16, where the correction includes adding, in the graphical model, at least one delay block that causes the temporal age of the first signal to be substantially equivalent to the temporal age of the second signal.

20. The device of claim 16, where:
the first signal is sampled at a first sample time,
the second signal is sampled at a second sample time, and
the first sample time is different than the second sample time.

21. The device of claim 16, where the one or more processors are further to:
provide, for display, options associated with tracking signal temporal ages in the graphical model,
receive a selection of a particular option from the options, and
determine the temporal age of the first signal and the temporal age of the second signal based on the particular option.

22. The device of claim 16, where the particular block includes a block of the graphical model that requires the first signal to be synchronized with the second signal.

23. A computer-readable medium storing instructions, the instructions comprising:
one or more instructions that, when executed by one or more processors of a device, cause the one or more processors to:
determine a temporal age of a first signal and a temporal age of a second signal provided in a graphical model,
the temporal age of the first signal being determined based on a first accumulation of time from a first point of reference until the first signal reaches a particular block, of the graphical model, that utilizes the first signal and the second signal,
the temporal age of the second signal being determined based on a second accumulation of time from a second point of reference until the second signal reaches the particular block, the first signal being different than the second signal, and the first point of reference and the second point of reference each being at least one of:
a transition between a physical domain and a computational domain,
a transition between a physical model or a physics model and at least one of a network model or an information model, or
a transition between sample times;

provide, for display and in the graphical model, the temporal age of the first signal and the temporal age of the second signal, determine, based on the temporal age of the first signal and the temporal age of the second signal, whether the first signal is consistent with the second signal at the particular block, and selectively:
provide, for display, a first indication indicating that the first signal is consistent with the second signal, at the particular block, when the temporal age of the first signal is substantially equivalent to the temporal age of the second signal, or
provide, for display, a second indication indicating that the first signal is not consistent with the second signal, at the particular block, when the temporal age of the first signal is substantially not equivalent to the temporal age of the second signal;

determine, when the temporal age of the first signal is substantially not equivalent to the temporal age of the second signal, a correction that causes the temporal age of the first signal to be substantially equivalent to the temporal age of the second signal;

implement the correction in the graphical model to generate a modified graphical model and cause the temporal age of the first signal to be substantially equivalent to the temporal age of the second signal in the modified graphical model; and utilize, by the particular block in the modified graphical model, the first signal and the second signal based on the temporal age of the first signal being substantially equivalent to the temporal age of the second signal.

24. The computer-readable medium of claim 23, where the instructions further comprise:
one or more instructions that, when executed by the one or more processors, cause the one or more processors to:
provide, for display, information associated with the correction.

25. The computer-readable medium of claim 23, where the correction includes adding, in the graphical model, at least one delay block that causes the temporal age of the first signal to be substantially equivalent to the temporal age of the second signal.

26. The computer-readable medium of claim 23, where:
the first signal is sampled at a first sample time,
the second signal is sampled at a second sample time, and
the first sample time is different than the second sample time.

27. The computer-readable medium of claim 23, where the instructions further comprise:
one or more instructions that, when executed by the one or more processors, cause the one or more processors to:
provide, for display, options associated with tracking signal temporal ages in the graphical model,
receive a selection of a particular option from the options, and
determine the temporal age of the first signal and the temporal age of the second signal based on the particular option.

28. The computer-readable medium of claim 23, where the particular block includes a block of the graphical model that requires the first signal to be synchronized with the second signal.

29. The computer-readable medium of claim 23, wherein the graphical model is generated by a technical computing environment, where the instructions further comprise:
one or more instructions that, when executed by the one or more processors, cause the one or more processors to:
automatically select, by the technical computing environment, a first source of the first signal and a second source of the second signal from the graphical model.

30. The computer-readable medium of claim 29, where the instructions further comprise:
one or more instructions that, when executed by the one or more processors, cause the one or more processors to:
provide a first source indication of the first source in the graphical model, and
provide a second source indication of the second source in the graphical model.

31. The computer-readable medium of claim 23, where the instructions further comprise:
one or more instructions that, when executed by the one or more processors, cause the one or more processors to:
receive a selection of a first source of the first signal and a second source of the second signal from the graphical model.

32. The computer-readable medium of claim 23, where the instructions further comprise:
one or more instructions that, when executed by the one or more processors, cause the one or more processors to:
receive a criterion for comparing the temporal age of the first signal and the temporal age of the second signal.

* * * * *

UNITED STATES PATENT AND TRADEMARK OFFICE
CERTIFICATE OF CORRECTION

PATENT NO. : 10,810,790 B1  
APPLICATION NO. : 14/136307  
DATED : October 20, 2020  
INVENTOR(S) : Pieter J. Mosterman et al.

Page 1 of 1

It is certified that error appears in the above-identified patent and that said Letters Patent is hereby corrected as shown below:

In the Specification

Column 12, Line 45 reads:
"time often (10) seconds. Also assume that TCE 220 deter-"

Should read:
--time of ten (10) seconds. Also assume that TCE 220 deter- --

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*